United States Patent [19]
Steiert et al.

[11] Patent Number: 6,122,735
[45] Date of Patent: Sep. 19, 2000

[54] FAULT RESILIENT BOOT CIRCUIT USING RING COUNTER

[75] Inventors: Gregory J. Steiert; Bassam N. Elkhoury, both of Olympia, Wash.

[73] Assignee: Intel Corp., Santa Clara, Calif.

[21] Appl. No.: 09/082,520

[22] Filed: May 21, 1998

[51] Int. Cl.[7] .............................. G06F 15/177; H04L 1/22
[52] U.S. Cl. ................................................. 713/2; 714/10
[58] Field of Search ............................. 713/1, 2; 714/23, 714/36, 48, 1, 11

[56] References Cited

U.S. PATENT DOCUMENTS

| | | | |
|---|---|---|---|
| 4,118,688 | 10/1978 | Glennon | 340/516 |
| 4,718,002 | 1/1988 | Carr | 364/200 |

*Primary Examiner*—Thomas C. Lee
*Assistant Examiner*—Nitin Patel
*Attorney, Agent, or Firm*—Kenyon & Kenyon

[57] ABSTRACT

A fault resilient circuit, having a ring counter, that boots a multi-device system, such as multi-processor computer system. A timer accepts start timer and system operational signals and produces a system fail signal. A ring counter accepts the system fail signal, and the ring counter produces a plurality of device control signals. With such an arrangement, when enabling all of the devices substantially simultaneously does not produce a working system, the boot circuit can for, example, enable all but one of the devices and determine if the system operates correctly with all but one of the devices enabled. If the system does not operate correctly with all but one of the devices enabled, a single device in the system can be enabled and it is determined if the system operates correctly with a single device enabled.

22 Claims, 3 Drawing Sheets

FAULT RESILIENT BOOT CIRCUIT USING RING COUNTER

FIELD OF THE INVENTION

The present invention relates to a boot circuit for a multi-device system, such as a multi-processor computer system. More particularly, the present invention relates to a fault resilient circuit that uses a ring counter.

BACKGROUND OF THE INVENTION

A multi-device system, such as a multi-processor computer system, increases system performance by using the devices in parallel. For example, a computer system can use four processors that simultaneously perform logical operations, creating a system that is much faster than one with a single processor. A multi-device system can also increase system reliability, because when one device fails the remaining devices can keep the system running.

In some multi-processor systems, all processors are started, or "booted," at one time when the system is turned on. In other words, when power is applied to the system all processors begin their normal start-up operations substantially simultaneously. If all of the processors operate normally, the system will be fully operational.

It is possible, however, that one of the processors will not operate normally. Moreover, a single processor can fail in such a way that prevents all of the other processors from operating normally. For example, a processor might place erroneous messages on an inter-processor bus, preventing all of the other processors from communicating. In this case, a single failed processor will cause the entire multi-processor system to fail. This result hampers one of the goals of a multi-processor system, namely, increased system reliability. Because there are multiple processors, and such a failure in any one of the processors can cause the entire system to fail, the reliability of the system can be worse than it would be with a single processor.

In one solution to this problem, less than all of the processors are booted up when a failure is detected. For example, if booting up all processors simultaneously fails to make the system operational, each processor in the multi-processor system can be individually booted up, one at a time, until the system becomes operational. Once the system becomes operational, the process is halted to prevent the failed processor from booting up. However, this reduces the performance benefit gained by operating the processors in parallel. In a four-processor system, such a solution limits the system to a single processor when any one processor fails. The other two processors, which have not failed, remain idle.

In another solution, when a failure is detected each processor is sequentially removed from the configuration, one at a time, while the remaining processors boot up substantially simultaneously. Each processor can be removed until the system becomes operational. In this way, a single failed processor in a four-processor system will result in all three operational processors being used. This approach also has a drawback. If two processors fail, the system will never become operational because only a single processor is removed from the system at any given time.

More complicated boot up schemes can be implemented to avoid these problems. For example, programmable elements, such as Programmable Array Logic (PAL) devices, can be designed to enable various combinations of processors until the optimal working configuration is achieved. These components, however, are expensive and must be specially designed for the system.

It should be noted that although a multi-processor system was used to illustrate the disadvantages of these boot circuit designs, other types of multi-device systems and boot circuit designs suffer from similar problems.

In view of the foregoing, it can be appreciated that a substantial need exists for a fault resilient boot circuit that maintains the benefit of increased performance in a multi-device system, at a reasonable cost, without losing the benefit of increased reliability.

SUMMARY OF THE INVENTION

In accordance with an embodiment of the present invention, a fault resilient boot circuit includes a system status determination unit that accepts start timer and system operational signals and produces a system fail signal. The boot circuit also includes a ring counter that accepts the system fail signal, and the ring counter produces a plurality of device control signals.

DETAILED DESCRIPTION

Figure 1:
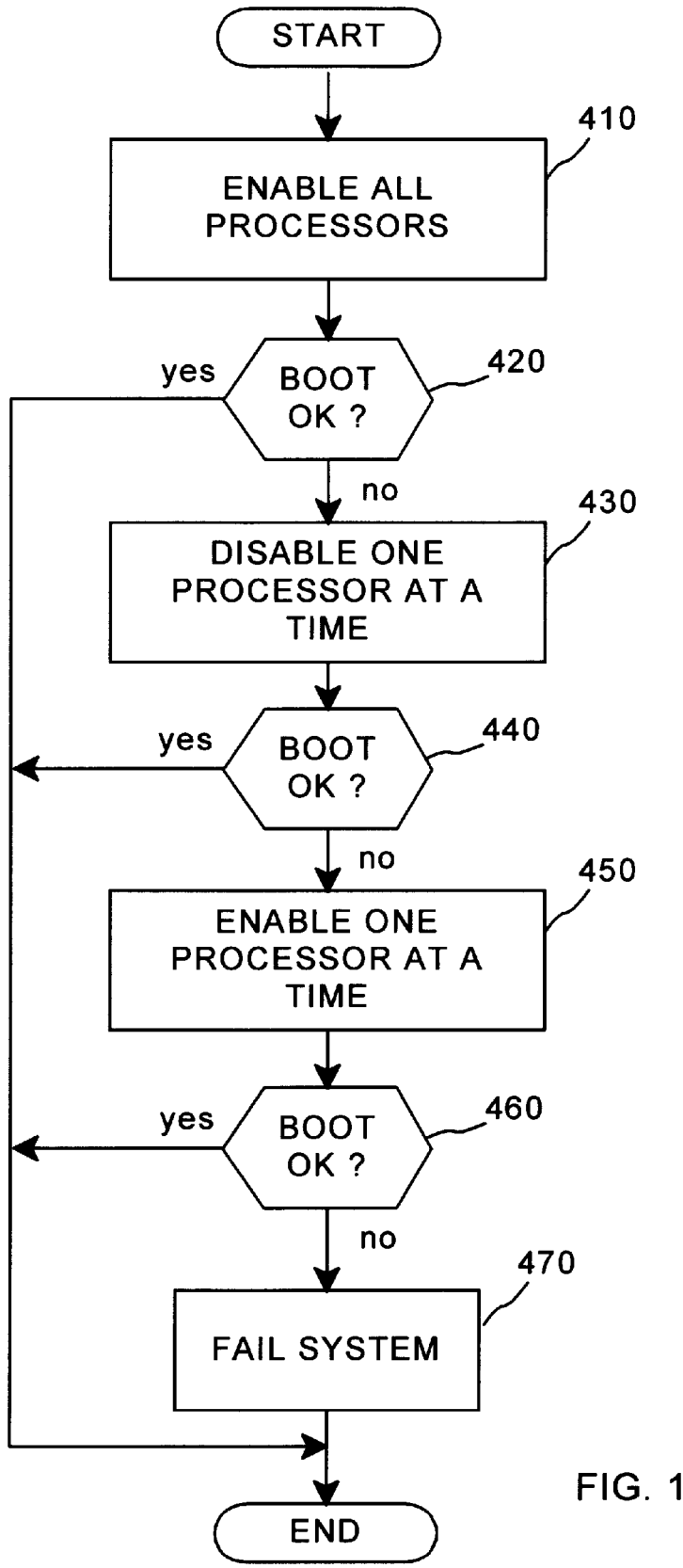
FIG. 1 is a block diagram of a method for selecting processors in a multi-processor system according to an embodiment of the present invention.

An embodiment of the present invention is directed to a fault resilient boot circuit that uses a ring counter. Referring now in detail to the drawings wherein like parts are designated by like reference numerals throughout, FIG. 1 is a block diagram of a method for selecting processors in a multi-processor system on power-up according to an embodiment of the present invention. When the system is turned on, all processors are enabled at 410. If the system boots correctly at 420, nothing further needs to be done and the system will be fully operational.

If the system does not boot correctly with all processors enabled, one processor at a time is disabled and the start-up process is retried at 430. This process can involve multiple retries, each one disabling a different processor. If the system boots correctly when a single processor is disabled at 440, the process ends. In this case, the system will be operational and will use all of processors, except the one causing the malfunction.

If the system never boots correctly with a single processor disabled, it can be assumed that more than one processor is malfunctioning. In this case, one processor at a time is enabled and start-up is retried at 450. This process can involve multiple retries, each one enabling a different processor. If the system boots correctly when a single processor is enabled at 460, the process ends. If the system never boots correctly with a single processor enabled, nothing can be done, and the entire system is failed at 470.

Figure 2:
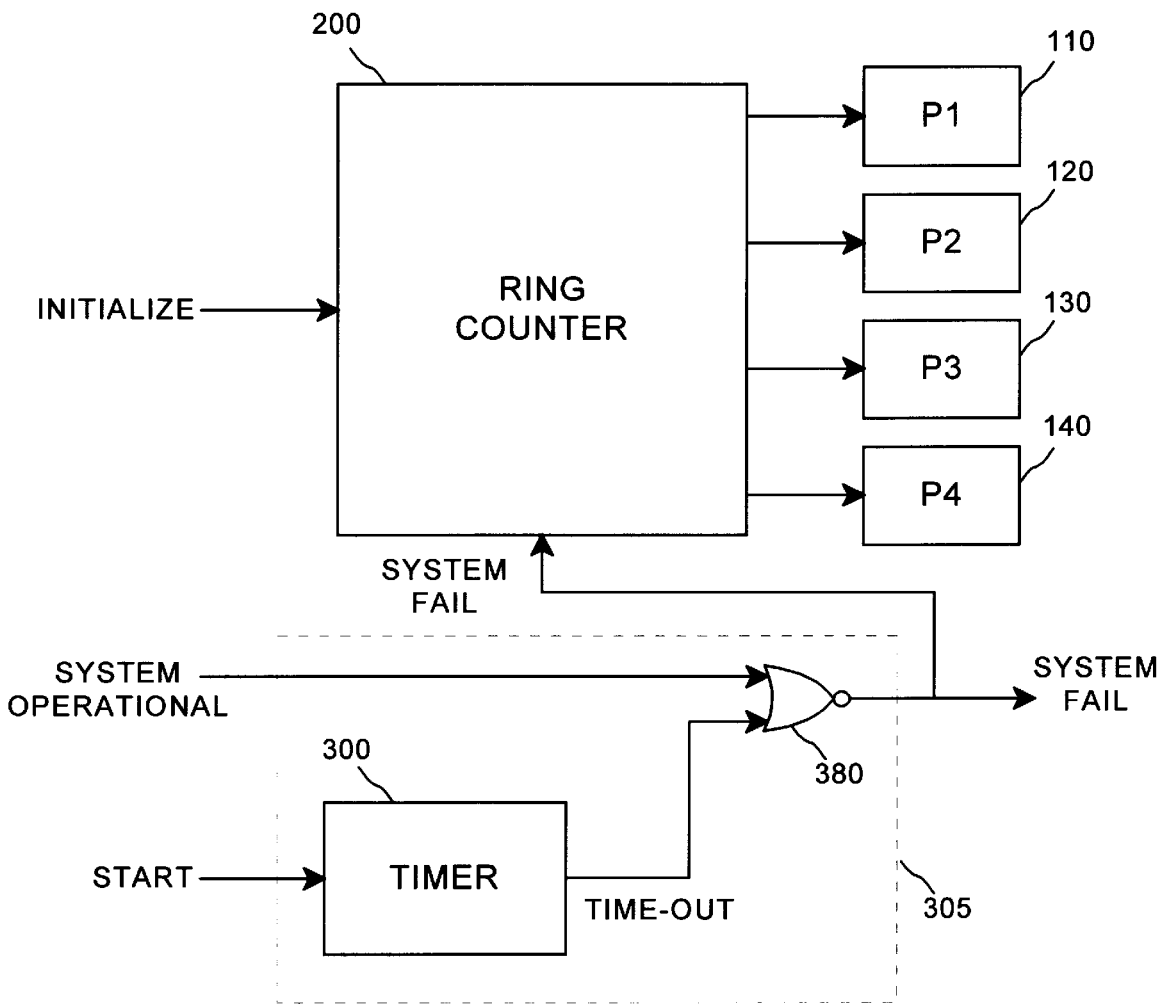
FIG. 2 is a block diagram of a fault resilient boot circuit according to an embodiment of the present invention.

FIG. 2 is a block diagram of a fault resilient boot circuit that can be used to implement the method shown in FIG. 1 according to an embodiment of the present invention. The boot circuit can be used in a multi-processor system to selectively enable and disable each of four processors 110, 120, 130, 140 during system power up. Although this embodiment of the present invention is illustrated with a four-processor system, it will be appreciated that systems with other numbers of processors may be used instead.

To do so, a system status determination unit 305 sends a system fail to a ring counter 200. The system status determination unit includes a NOR gate 380 and a timer 300. The purpose of the timer 300, which is initiated by a start signal, is to give the four processors 110, 120, 130, 140 a chance to initialize and begin normal operation. The timer 300 generates a time-out signal a fixed amount of time, such as a 5 second time-out period, after the start signal is received.

If the four processors 110, 120, 130, 140 do not begin to operate normally within the fixed amount of time, it can be assumed that one or more of the processors has failed and is preventing the system from operating. Therefore, the time-out signal and a system operational signal, which indicates that the system is operating normally, are input to the NOR gate 380. The system operational signal may be, for example, a general purpose Input/Output (I/O) signal. The output of the NOR gate 380 is a system fail signal because it implies that the time-out period has elapsed and no system operational signal is present.

The four processors 110, 120, 130, 140 are each enabled by an output signal from the ring counter 200. As used herein, the term "ring counter" refers to any counter having a multi-bit register with at least one output bit fed back into the register as an input bit. Because an output bit can be fed back into a neighboring input bit, a ring counter is similar to a shift register in that it can easily rotate a bit pattern, such as the patterns "0001," "0010," "0100" and "1000." This design lets the ring counter 200 sequence through a series of bit patterns using only a minimal amount of hardware, and the ring counter 200 receives an initialize signal that places the four processor enable signals in an initial state. The ring counter 200 also receives the system fail signal as an input.

The operation of the fault resilient boot circuit will now be described. When the system is turned on, the initialize signal places the ring counter 200 in an initial state such that the four control signals enable all of the four processors 110, 120, 130, 140. Also, the start signal causes the timer 300 to start timing.

If the four processors 110, 120, 130, 140 begin to function normally, the system operational signal is generated. Because the system operational signal is input to the NOR gate 380 along with the time-out signal from the timer 300, no system fail signal will be generated when the system operational signal is present. In this case, the system has booted normally and the boot circuit does nothing further.

If, however, one or more of the processors 110, 120, 130, 140 malfunction and prevent the system from functioning normally, no system operational signal will be generated. In this case, the timer 300 will eventually time-out and a system fail signal will be generated. The system fail signal advances the ring counter 200 from the initial state to a first state. The first state could, for example, disable the first processor 110. The other processors 120, 130, 140 would remain enabled. The system fail signal also causes all four processors 110, 120, 130, 140 to reset, but now only three of the processors 120, 130, 140 will come back and try to operate normally. If the first processor 110 had caused to the system to fail initially, the system will function with the remaining three processors 120, 130, 140 and a system operational signal will now be generated. The boot circuit does nothing further.

If the system still fails to begin to function normally, no system operational signal will be generated and the timer 300 will eventually time-out once again. This will cause another system fail signal and the ring counter 200 will advance from the first state to a second state. In this way, the ring counter 200 can selectively disable one processor at a time, leaving the other three processors operational, until the system boots normally. For example, the second state may disable the second processor 120 while keeping the other three processors 110, 130, 140 enabled.

When all four processors 110, 120, 130, 140 have been individually disabled without a successful boot, it can be assumed that more than one processor is malfunctioning. In this case, the ring counter 200 can selectively enable one processor at a time, leaving the other three processors disabled, until the system boots normally. For example, the ring counter can disable the first three processors 110, 120, 130 while keeping the fourth processor 140 enabled. If the system fails to boot in all of these cases, nothing more can be done and the system cannot be started.

Figure 3:
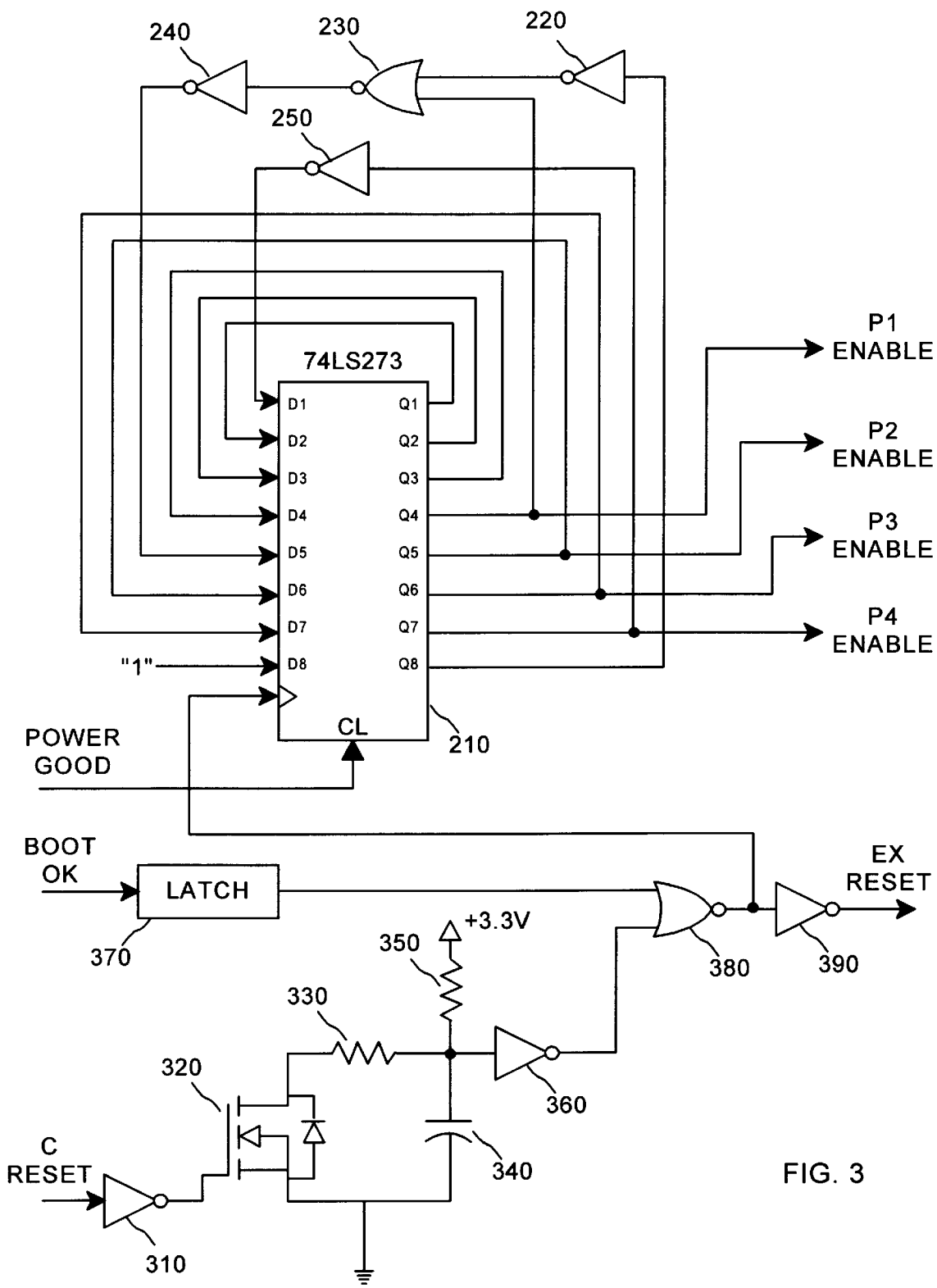
FIG. 3 shows the fault resilient boot circuit of FIG. 2 in greater detail according to an embodiment of the present invention.

FIG. 3 shows the fault resilient boot circuit of FIG. 2 in greater detail according to an embodiment of the present invention. The circuit uses a Resistance-Capacitance (RC) timer to detect when a boot has failed and a seven bit ring counter to systematically disable different combinations of processors until the system finally boots successfully. Although this embodiment of the present invention is illustrated with a seven bit ring counter, it will be appreciated that ring counters with other numbers of bits may be used instead.

When the system is first turned on, a power good signal is generated and the ring counter enables all processors. The timing circuit begins to start the time-out period with the de-assertion of a "C reset" signal as follows. The C reset signal passes through an inverter 310 and is input to the gate of a Metal-Oxide Semiconductor Field-Effect Transistor (MOSFET) 320. The source of the MOSFET is connected to ground and the drain is connected to one end of a resistor 330. The other end of the resistor 330 connects to a capacitor 360, whose other end is connected to ground, and another resistor 350, whose other end is connected to a 3.3 volt power source. The end of the resistor 330 opposite the MOSFET 320 is also input to an invertor 360 and the output of that invertor 360 is the "time-out" signal. By selecting appropriate values for the resistors 330, 350 and capacitor 340 in the RC circuit, the time-out signal is generated after a predetermined period of time, such as 5 seconds, by way of example.

If the system does not set the BOOT OK flag, such as a general purpose I/O pin that indicates that the system is operating normally, before the timer-out signal is generated, the output of the NOR gate 380, which can be considered a system fail signal, will progress the ring counter to the next state, described below, and drive a hard external reset, which resets the four processors. This reset will eventually result in the de-assertion of the C reset signal, such as two clock cycles later, and the time-out processing repeats.

The state of the ring counter then selects different combinations of processors using the P1 to P4 enable signal. After booting all processors substantially simultaneously fails to result in a BOOT OK signal, each processor is disabled individually, and then each processor is enabled individually. This can be done, for example using a M0 Flush input to a Pentium™ Pro or Pentium™ II processor available from Intel, which disables a processor when it is held low coming out of a reset, as the P1 to P4 enable signals.

The boot circuit uses a 7-bit ring counter, plus one additional bit for initialization, to generate the P1 to P4 enable signals. Therefore, all of the signals can be implemented in a single 8-bit register 210 that has a separate clear signal, such as the 74LS273 chip available from Fairchild Semiconductor. Although this embodiment of the present invention is illustrated with a 74LS273 chip, it will be appreciated that other integrated circuits may be used instead. The 8-bit register 210 has 8 input bits, labeled D1 to D8, and 8 output bits, labeled Q1 to Q8.

The output bits Q1 through Q6 are each fed into the next input bit, as they would be in a normal shift register. The output bit Q1 is connected to the input bit D2, and so on. The output bit Q7 is connected to the input bit D1 through an inverter 250. Note that for initialization purposes, the output bit Q4 does not directly feed back into the input bit D5. Instead, the output bit Q4 passes through a NOR gate 230 along with the output bit Q8. The output of the NOR gate 230 passes through an inverter 240 before being sent to input bit D5.

When power is turned on, the register 210 is cleared by the power good signal so that all outputs are low, or "0." To get the proper pattern into the ring counter, a high, or "1," is inserted into one of the bits so that the following patterns are shifted through the counter: 0001000 and then 1110111. The output bit Q8 in the register 210 is cleared at power up with the rest of the output bits Q1 to Q7. However, because the input bit D8 is hard wired to a "1," the output bit Q8 will transition to "1" after the first rising edge of the clock input to the 8-bit register 210, or the system fail signal.

The output bit Q4 is logically ORed with the inverse of the output bit Q8 before it is fed back into the input for bit Q5. Before the first clock edge, output bits Q4 and Q8 are "0," so the value of output bit Q4 ORed with the inverted bit Q8 is "1," and output bit Q5 will be "1" after the first clock. In this way, the ring counter pattern is initialized.

After the first clock, output bit Q8 is "1," making the inverse of output bit Q8 "0," so output bit Q4 ORed with the inversed output bit Q8 is simply output bit Q4 ORed with "0," and input bit D5 is just output bit Q4. Table 1 shows the states of output bits Q1 to Q8 for the circuit shown in FIG. 3.

TABLE 1

Fault Resilient Boot Circuit States

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| Q1 | 0 | 1 | 1 | 1 | 0 | 1 | 1 | 1 | 0 | 0 | 0  | 1  | 0  | 0  | 0  | 1  |
| Q2 | 0 | 0 | 1 | 1 | 1 | 0 | 1 | 1 | 1 | 0 | 0  | 0  | 1  | 0  | 0  | 0  |
| Q3 | 0 | 0 | 0 | 1 | 1 | 1 | 0 | 1 | 1 | 1 | 0  | 0  | 0  | 1  | 0  | 0  |
| Q4 | 0 | 0 | 0 | 0 | 1 | 1 | 1 | 0 | 1 | 1 | 1  | 0  | 0  | 0  | 1  | 0  |
| Q5 | 0 | 1 | 0 | 0 | 0 | 1 | 1 | 0 | 1 | 1 | 1  | 0  | 0  | 0  | 0  | 1  |
| Q6 | 0 | 0 | 1 | 0 | 0 | 0 | 1 | 1 | 1 | 0 | 1  | 1  | 1  | 0  | 0  | 0  |
| Q7 | 0 | 0 | 0 | 1 | 0 | 0 | 0 | 1 | 1 | 0 | 1  | 1  | 1  | 1  | 0  | 0  |
| Q8 | 0 | 1 | 1 | 1 | 1 | 1 | 1 | 1 | 1 | 1 | 1  | 1  | 1  | 1  | 1  | 1  |

State 15 is the same as state 1, and the pattern repeats. Focusing on the processor control signals, or output bits Q4 through Q7, Table 2 shows the processor control signal states, or P1 enable to P4 enable, for the circuit shown in FIG. 3. Note that a state of "0" indicates that the associated processor is enabled and a state of "1" indicates that the associated processor is disabled.

TABLE 2

Processor Control Signal States

|    | 0 | 1 | 2 | 3 | 4 | 5 | 6 | 7 | 8 | 9 | 10 |
|----|---|---|---|---|---|---|---|---|---|---|----|
| Q4 | 0 | 0 | 0 | 0 | 1 | 1 | 1 | 0 | 1 | 1 | 1  |
| Q5 | 0 | 1 | 0 | 0 | 0 | 1 | 1 | 1 | 0 | 1 | 1  |
| Q6 | 0 | 0 | 1 | 0 | 0 | 0 | 1 | 1 | 1 | 0 | 1  |
| Q7 | 0 | 0 | 0 | 1 | 0 | 0 | 0 | 1 | 1 | 1 | 0  |

By the 11th state, several types of boots have been attempted. In state 0, the case with all processors enabled was tried. Then, in states 1 to 4, boots with all but one processor enabled were tried. Finally, in states 6 to 10, boots with only one processor enabled were tried. There is also one case, state 5, where two processors are enabled and two processors are disabled. This is simply an artifact of the particular ring counter circuit shown in FIG. 3.

The advantage of this circuit is that it uses a seven bit pattern for the ring counter, so that the ring counter, plus a single bit to initialize it, can be contained in a common eight-bit register. The simplicity of this design makes it a very cost effective solution in a four-processor system. For example, such a boot circuit could be used in a server having four processors. Any multi-processor system can take advantage of this type of boot circuit.

Although various embodiments are specifically illustrated and described herein, it will be appreciated that modifications and variations of the present invention are covered by the above teachings and within the purview of the appended claims without departing from the spirit and intended scope of the invention. For example, although a ring counter with an eight-bit register was used to illustrate the boot circuit for a four-processor system, it will be appreciated that other circuits for systems having other numbers of processors could also fall within the scope of the invention. Moreover, although a multi-processor system was used to illustrate the boot circuit, a boot circuit for any multi-device system could similarly fall within the scope of the invention.

What is claimed is:

1. A fault resilient boot circuit, comprising:
   a system status determination unit accepting a start timer signal and a system operational signal and producing a system fail signal; and
   a ring counter accepting the fail signal, said ring counter producing a plurality of device control signals and comprising an n-bit register having said system fail signal coupled to said n-bit register's clock input signal.

2. The fault resilient boot circuit of claim 1, wherein said system status determination unit comprises:
   a timer accepting the start timer signal and producing a time-out signal; and
   a logic device accepting the time-out signal and the system operational signal and producing the system fail signal.

3. The fault resilient boot circuit of claim 2, wherein said logic device is a NOR gate.

4. The fault resilient boot circuit of claim 1, wherein each time the system fail signal is produced, said ring counter selectively enables all but one of the device control signals, a different device control signal being not enabled each time, and then selectively enables a single device control signal, a different device control signal being enabled each time.

5. The fault resilient boot circuit of claim 1, wherein the device control signals are processor control signals.

6. The fault resilient boot circuit of claim 1, wherein said n-bit register having an output of at least one register being coupled to an input of at least one other register.

7. The fault resilient boot circuit of claim 1, wherein said n-bit register has eight input signals D1 to D8 and eight output signals Q1 to Q8; and wherein Q1 is coupled to D2, Q2 is coupled to D3, Q3 is coupled to D4, Q5 is coupled to D6, Q6 is coupled to D7, Q7 is coupled to D1 through an inverter, Q4 is coupled to a NOR gate, Q8 is coupled to the NOR gate through an inverter, the output signal from the NOR gate is coupled to D5 through an inverter, and D8 is coupled to a "1."

8. The fault resilient boot circuit of claim 7, wherein the output signals Q4 to Q7 are said ring counter's device control signals.

9. The fault resilient boot circuit of claim 8, wherein the four device control signals cycle through the following states, a "0" representing enabled and a "1" representing not enabled: 0000, 0100, 0010, 0001, 1000, 1100, 1110, 0111, 1011, 1101 and 1110.

10. A method of selecting devices in a multi-device system, comprising:

enabling all but one of the devices using a ring counter to select a different device to be not enabled each time the enabling is repeated;

determining if the system operates correctly with all but one of the devices enabled;

enabling a single device in the system using said ring counter if the system does not operate correctly with all but one of the devices enabled; and determining if the system operates correctly with a single device enabled.

11. The method of claim 10, further comprising:

enabling all of the devices in the system; and determining if the system operates correctly with all of the devices enabled;

said enabling all but one of the devices being performed only if the system does not operate correctly with all of the devices enabled.

12. The method of claim 11, wherein said enabling all but one of the devices and determining if the system operates correctly with all but one of the devices enabled are repeated, a different device being not enabled each time the enabling and determining are repeated.

13. The method of claim 12, wherein said enabling all but one of the devices and determining if the system operates correctly with all but one of the devices enabled are repeated until every device has been not enabled.

14. The method of claim 11, wherein said enabling a single device and determining if the system operates correctly with a single device enabled are repeated, a different device being enabled each time the enabling and determining are repeated.

15. The method of claim 14, wherein said enabling a single device and determining if the system operates correctly with a single device enabled are repeated until every device has been enabled.

16. The method of claim 15, further comprising:

failing the system if the system did operate correctly with a single device enabled, and every device has been so enabled.

17. The method of claim 10, wherein the devices are processors.

18. The method of claim 17, wherein multi-device system is a four-processor computer system.

19. The method of claim 10, wherein said enabling a single device is repeated using said ring counter to select a different device to be so enabled each time the enabling is repeated.

20. The method of claim 10, wherein determining comprises:

determining if the system operates correctly within a predetermined period of time.

21. An apparatus that selects devices in a multi-device system, comprising:

means for enabling all but one of the devices using a ring counter to select a different device to be not enabled each time the enabling is repeated;

means for determining if the system operates correctly with all but one of the devices enabled;

means for enabling a single device in the system using said ring counter if the system does not operate correctly with all of the devices enabled and does not operate correctly with all but one of the devices enabled; and means for determining if the system operates correctly with a single device enabled.

22. A computer system, comprising:

a plurality of processors;

a system status determination unit accepting a start timer signal and a system operational signal and producing a system fail signal; and a ring counter accepting the system fail signal, said ring counter producing a plurality of processor control signals, each of said processor control signals being coupled to one of said plurality of processors, said ring counter comprising an n-bit register having said system fail signal coupled to said n-bit register's clock input signal.

* * * * *